Feb. 10, 1931.   F. W. ARMITAGE ET AL   1,791,698
VARIABLE SPEED TRANSMISSION
Filed Dec. 23, 1929   3 Sheets-Sheet 1

Inventor
FREDERICK W ARMITAGE
EDWARD G ARCHER
By C. L. Parker Jr.
Attorney

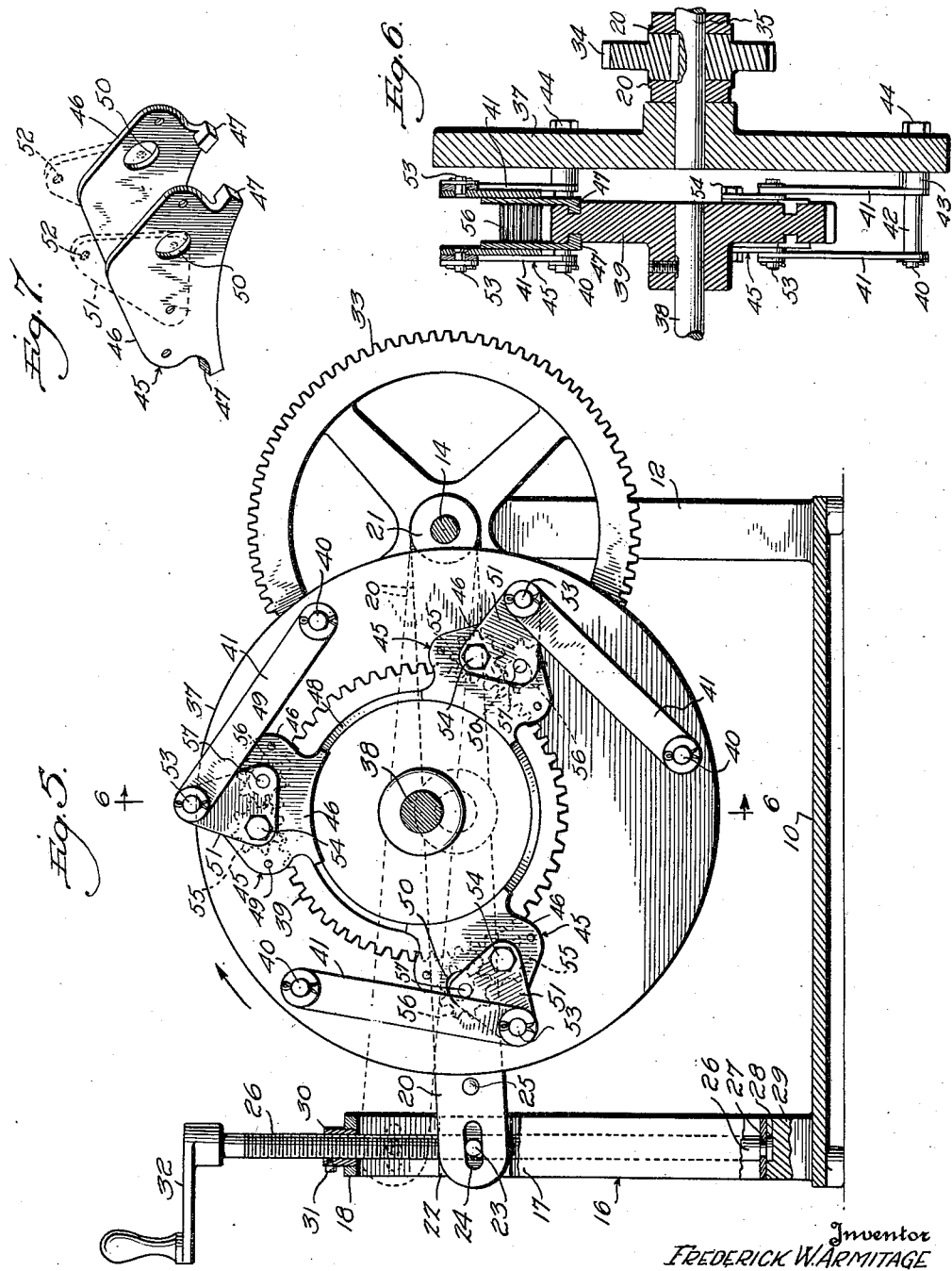

Patented Feb. 10, 1931

1,791,698

UNITED STATES PATENT OFFICE

FREDERICK W. ARMITAGE AND EDWARD G. ARCHER, OF HOPEWELL, VIRGINIA, ASSIGNORS OF ONE-THIRD TO TOM A. BURFORD, OF HOPEWELL, VIRGINIA

VARIABLE-SPEED TRANSMISSION

Application filed December 23, 1929. Serial No. 416,160.

This invention relates to variable speed transmissions.

An important object of the invention is to provide a novel variable speed transmission which is adapted for use in connection with a wide variety of mechanisms such as automobile transmissions, steam and electric locomotive drives, marine driving means, hoists, elevators and conveyors, textile machinery, etc., wherein a positive uniform variable speed drive is desired or necessary.

A further object is to provide a transmission of the character referred to which is particularly adapted for use in connection with textile machinery, and more especially with reference to the manufacture of artificial silk, wherein variable speed drive means is required for rotating the spools or drums upon which the filaments are wound.

A further object is to provide novel positive variable speed driving means which is adapted for converting uni-directional constant speed rotation into a speed varying infinitely from the speed of the prime mover to zero and/or from zero speed to the speed of the prime mover in the opposite direction.

A further object is to provide novel positive variable speed driving means which is adapted for converting uni-directional constant speed rotation into a speed varying infinitely from the speed of the prime mover to a speed greater than that of the prime mover in one direction of rotation.

A further object is to provide a positive gear type transmission as distinguished from the usual frictional drive means now commonly employed in many industries including that relating to textiles.

A further object is to provide a transmission of the character referred to which is positive in action and not subject to unintentional variations due to the wear of the parts, etc., as is true in connection with variable speed transmissions of the friction type.

A further object is to provide a variable speed transmission wherein any desired speed variations may readily be effected without stopping the operation of the apparatus.

A further object is to provide a variable speed transmission wherein the transmission of power is accomplished through positive drive means such as gear elements, and wherein the gears employed are constantly arranged in mesh with each other or in meshing relationship, thus eliminating excess wear and breakage of parts.

A further object is to provide a positive transmission of the character referred to wherein an infinite number of speed variations may be quickly and smoothly secured without passing through successive steps.

Other objects and advantages of the invention will become apparent during the course of the following description.

In the drawings we have shown one embodiment of the invention. In this showing,

Figure 5 is a similar view on line 5—5 of Figure 1, parts being broken away,

Figure 6 is a detail section on line 6—6 of Figure 5, and,

Figure 7 is a detail perspective view of a pair of pinion drive carriers.

Figure 1:
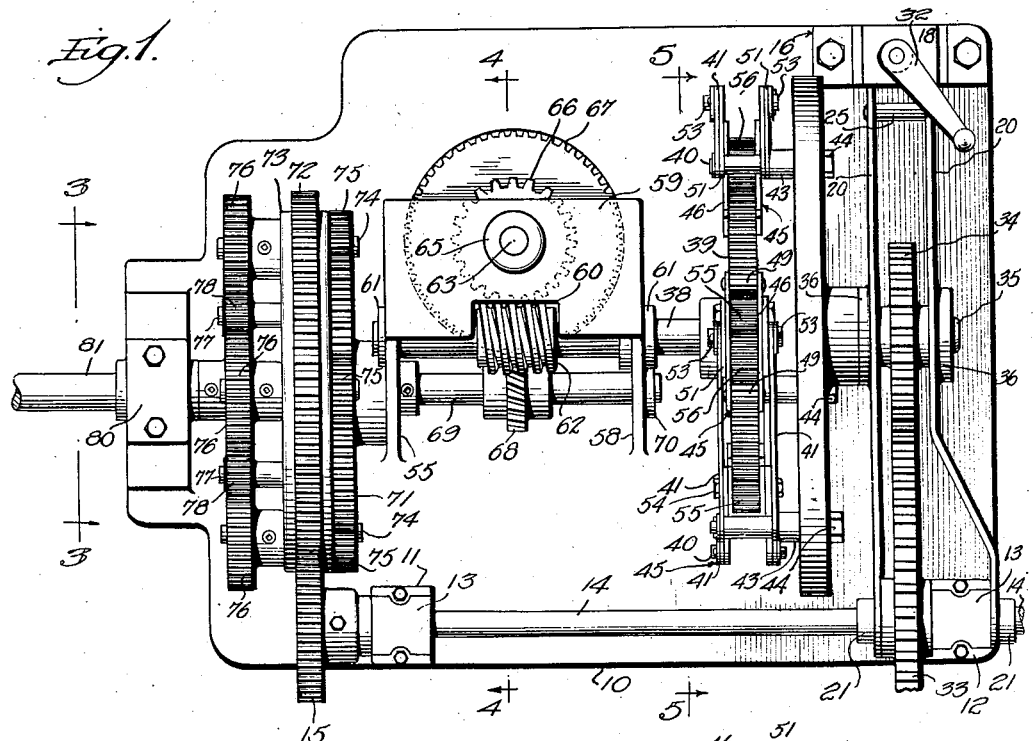
Figure 1 is a plan view.

In the drawings the embodiment of the invention illustrated provides a power take-off shaft the rotational speed of which is adapted to be varied from a given maximum to a given minimum speed throughout the range of variation of which the power take-off shaft rotates in the same direction. It will become apparent however, that the apparatus may be varied to permit the power take-off shaft to be varied from a given maximum speed to zero speed, or wherein the shaft may be made to rotate in the opposite direction.

Referring to the drawings, the numeral 10 designates a suitable base or support adjacent one side of which is mounted a pair of vertical standards 11 and 12 carrying bearings 13 at their upper ends. A shaft 14 is mounted to rotate in the bearings 13 and is provided adjacent the bearing 11 with a driving pinion 15 for a purpose to be described. The opposite end of the shaft 14 is connected to any desired prime mover to be driven thereby at a constant speed.

At the side of the base opposite the standard 12 there is arranged a vertical standard 16 including spaced parallel side members 17 connected at their upper ends by a cross member 18.

A pair of arms 20 is provided at one end with bearings 21 rotatably receiving the shaft 14, one of the bearings 21 being arranged adjacent the outer face of the bearing 13, while the other arm 20 is arranged at a point spaced from the opposite side thereof. The free ends of the arms 20 project between the arms 17 of the standard 16 and are provided therebetween with a bearing block 22. The bearing block 22 is provided with opposite trunnions 23 extending beyond the bearing block and slidable in slots 24 extending longitudinally of the arms 20. The end portions of the arms 20 adjacent the bearing block are spaced from each other by a rigid pin 25. A threaded stem 26 projects vertically through the standard 16 and is provided adjacent its lower end with a reduced neck 27 and an enlarged head 28 rotatable in a bearing block 29 to prevent vertical movement of the screw. A collar 30 may surround the stem 26 where the latter projects through the cross member 18, and the collar may be secured to the stem 26 by a set screw 31. The upper end of the stem 26 is provided with an operating crank 32.

A gear 33 is keyed or otherwise secured to the shaft 14 and meshes with a preferably smaller gear 34 secured to a shaft 35 rotatable in bearings 36 carried by the arms 20. Accordingly it will be apparent that the rotation of the shaft 14 by the prime mover is adapted to rotate the shaft 35 through the medium of the gears 33 and 34.

Figure 2:
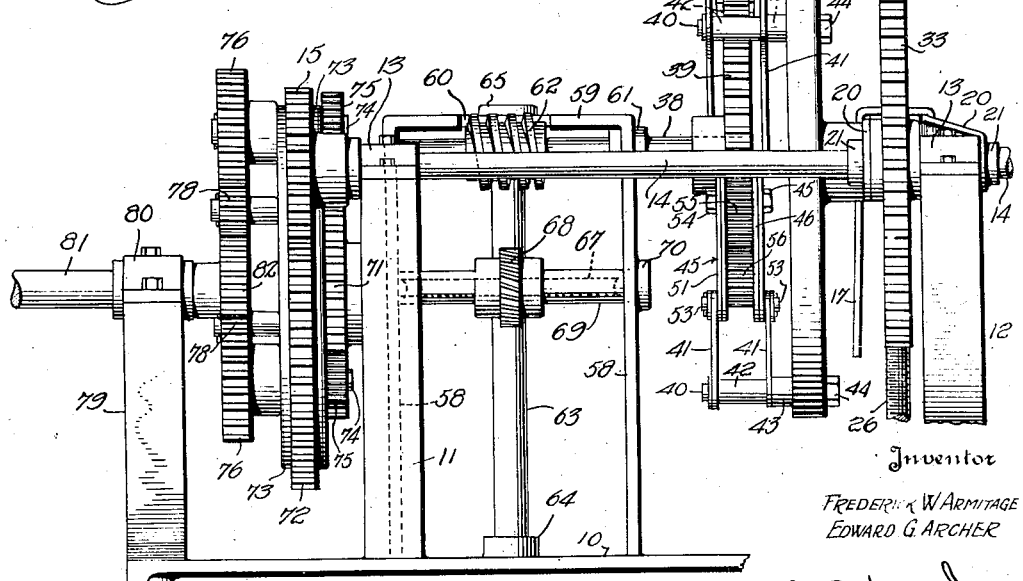
Figure 2 is a side elevation.

A rotatable driving member 37 is secured to the shaft 35 as shown in Figures 1 and 6. Means associated with the driving member 37 are adapted to transmit rotative force to a shaft 38 in a manner to be described, and the proportionate speeds of rotation of the member 37 and shaft 38 depend upon the arrangement of the axes of these elements with respect to each other. Referring to Figures 1, 2, 5 and 6, the numeral 39 designates a gear secured in any suitable manner to the shaft 38 to rotate therewith. A plurality of equidistantly spaced transversely extending posts 40 is secured to the driving member 37, and the posts 40 project beyond the plane of the gear 39 as shown in Figures 1 and 2. A pair of arms 41 is pivotally connected to each of the posts 40. The arms of each pair are spaced from each other and are held in such spaced relation adjacent the posts 40 by a collar 42. Each post 40 is provided with an enlarged portion 43 seating against the driving member 37 and spacing the inner arm 41 of each pair therefrom. A nut 44 on the opposite side of the members 37 secures each post 40 in position.

A pinion carrier indicated as a whole by the numeral 45 is associated with each pair of arms 41. Each carrier 45 comprises a pair of spaced parallel side plates 46, and each of these plates is provided at its ends with inwardly projecting arcuately arranged lugs 47 adapted to travel in concentric grooves 48 formed in opposite faces of the gear wheel 39. The plates 46 of each pair are spaced from each other by pins 49. Each of the plates 46 is provided with alined relatively large openings 50 for a purpose to be described.

A substantially triangular plate 51 is arranged against the outer face of each of the plates 46, the plates 51 on opposite sides of each carrier corresponding in shape and relative positions to each other. The outer portions of the plates 51 are apertured as at 52 to receive pins 53 by means of which each pair of arms 41 is pivotally connected to the corresponding pair of plates 51. Each pair of plates 51 is pivotally connected to one of the carriers 45 by means of a pivot pin 54, and such pin also serves to pivotally support a pinion 55 meshing with the gear 39. It will be apparent that since the pins 54 pass through the plates 46 of the carrier, the pinions 55 will be held constantly in mesh with the gear 39.

A second pinion 56 is associated with each carrier and is rotatably supported by a pin 57 connected at its ends to the corresponding pair of plates 51. The pins 57 project through the relatively large openings 50 whereby it will be apparent that the pins 57 are movable inwardly and outwardly with respect to the gear 39 within the limits of the openings 50 as the pairs of plates 51 swing about the axes of the pins 54. In this connection it will be noted that the upper pinions 55 and 56 illustrated in Figure 5 are in mesh with each other and with the gear 39, while the two lower pinions 56 mesh with the corresponding pinions 55 but not with the gear 39. However, since the pinions 56 are always in mesh with the pinions 55, it will be apparent that the former are always in position to be meshed with the gear 39 upon proper swinging movement of the plates 51.

A supporting structure including vertical arms 58 is carried by the base 10, and the upper ends of the arms 55 are connected by a cross member 59, notched centrally of one edge thereof as at 60. The arms 58 carry bearings 61 rotatably supporting the shaft 38, and the latter is provided intermediate the arms 58 with a worm 62. This worm may be arranged in the notch 60 as shown in Figures 1 and 2.

A vertical shaft 63 is journalled at its lower end in a bearing 64 carried by the base 10, and at its upper end in a bearing 65 carried by the cross member 59. A worm wheel 66 is carried by the shaft 63 and meshes with the worm wheel 62 to be driven thereby. The shaft 63 also carries a helical gear 67 meshing with a helical pinion 68 carried by a counter shaft 69, and this shaft is journalled in bearings 70 carried by the supports 58.

Figure 4:
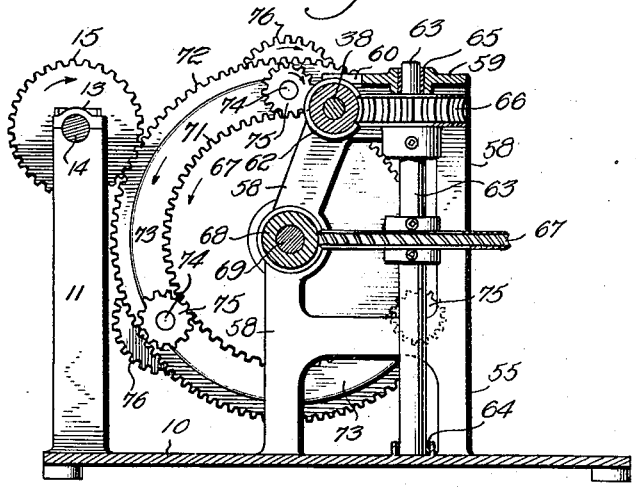
Figure 4 is a similar view on line 4—4 of Figure 1.

The shaft 14 is positively driven, while the shaft 69 is driven at variable speeds according to the desired final speed of rotation, and the proportionate speeds of the shafts referred to are utilized through a compound epicyclic train to drive a power take off shaft. Referring to Figures 1, 2 and 4, the numeral 71 designates a gear connected to the shaft 69 to be driven thereby. A master gear 72 is arranged adjacent and parallel to the gear 71, and the axes of these two gears coincide. The pinion 15, carried by the shaft 14, meshes with the master gear 72 whereby it will be apparent that the latter is driven at a constant speed.

The master gear 72 is formed on the outer edge of a master driving disk 73 in which is journalled a plurality of shafts 74 having their axes arranged circularly concentric to the axis of the gear 72. Each shaft 74 carries a planetary pinion 75 meshing with the gear 71, as shown in Figure 4, while the outer ends of the shafts 74 carry larger pinions 76. Inwardly of the shafts 74, a second set of stub shafts 77 is carried by the driving disk 73, the axes of the shafts 77 also lying in a circle concentric to the axis of the master gear 72. Small pinions 78 are carried by the shafts 77 and mesh with the respective pinions 76.

Figure 3:
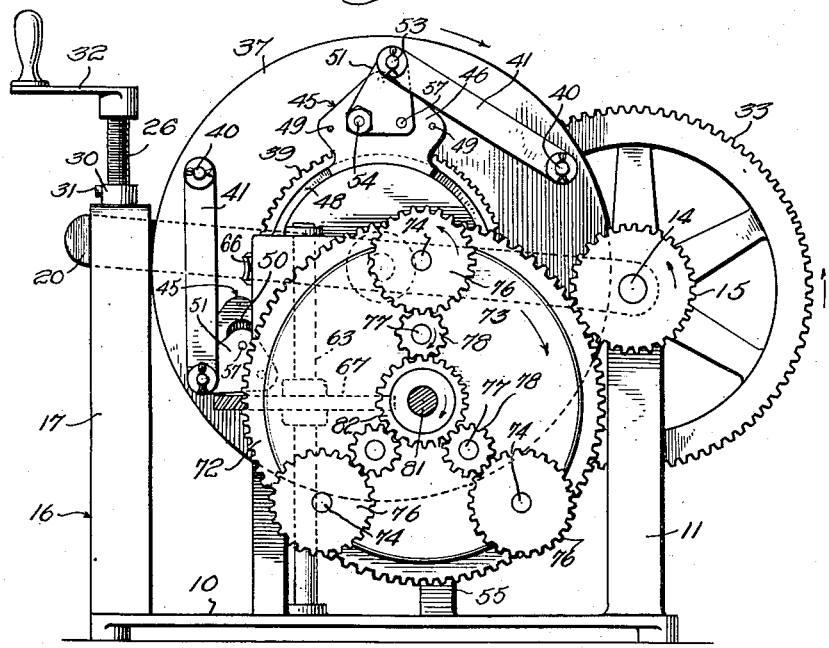
Figure 3 is a section on line 3—3 of Figure 1.

Referring to Figures 1 and 2, the numeral 79 designates a standard carried by the base 10 and provided at its upper end with a bearing 80 rotatably supporting a shaft 81. This shaft constitutes the power take off shaft of the embodiment of the mechanism illustrated, and the take off shaft is provided at its inner end with a gear 82 meshing with the intermediate pinions 78, as shown in Figure 3.

The operation of the apparatus is as follows:

The shaft 14 is connected to a prime mover to be driven thereby at a constant speed, while the operating crank 32 is rotated to cause the power take off shaft 81 to rotate at variable speeds as may be desired according to the form of the device being driven thereby. Rotation of the power input shaft 14 obviously effects positive rotation of the gears 34 and 72 through their driving gears 33 and 15 respectively.

The driving disk 37 is carried by the shaft 35 to be rotated thereby at a constant speed, and accordingly it will be apparent that the posts 40 are caused to travel with the driving disk 37, carrying with them the arms 41. The pulling action exerted upon the arms 41, as the driving disk rotates in the direction of the arrow illustrated in Figure 3, is transmitted to the plates 51, and through them, to the plates of the carriers 45. It will be apparent that the pinion carriers 45 are adapted to slide circumferentially with respect to the gear wheel 39, due to the arrangement of the lugs 47 in the guide slots 48, but this sliding movement is dependent upon the positions of the various sets of pinions 55 and 56 with respect to each other and with respect to the gear 39.

The operating crank 32 may be rotated to cause vertical movement of the bearing block 22, and this vertical movement will be transmitted to the free ends of the arms 20. These arms swing about the axis of the shaft 14 and rotatably support the gear 34, driving disk 37, and the elements previously described associated therewith. The arms 20 may be considered to be in their normal position when arranged as shown in Figures 3, and 6, the axes of the shafts 35 and 38 coinciding with each other. Under such conditions, each of the pinions 56 not only meshes with its corresponding pinion 55, but also with the gear 39. A pulling force is transmitted by the arms 41 to the plates 51 in the manner previously described, but these plates cannot swing inwardly beyond the positions at which the pinions 56 are fully in mesh with the gear 39. At the point at which such swinging movement of the plates 51 ceases, a positive rotating force will be transmitted by the arms 41 to the gear 39 since the meshing of the pinions 55 and 56 with each other and with the gear 59 prevents the pinions referred to from rotating about their own axes.

When the gear 39 is driven in the manner just described, its rotation is imparted to the shaft 38 to rotate the worm 62, and rotation of the worm is transmitted to the worm wheel 66 to drive the vertical shaft 63. This action in turn is transmitted to the helical gear 67 and thence to the helical pinion 68 which drives the shaft 69. Rotation of the latter shaft obviously causes rotation of the variable driving gear 71.

The provision of the various gearing elements for driving the respective gears 71 and 72 is such that when the shafts 35 and 38 are arranged in axial alinement, the gears 71 and 72 will be driven at the same speed. The gearing referred to, however, constitutes only one embodiment of the invention, and it will be apparent that under the conditions referred to with respect to the shafts 35 and 38, the gears 71 and 72 may be made to rotate with respect to each other. The invention however, is being particularly described with respect to the specific embodiment thereof illustrated in the drawings.

Assuming the gears 71 and 72 to be rotating at equal speeds under the conditions stated, it will be apparent that the stub shafts 74 will travel with the wheel 72 about the axes thereof, and the rotative speeds of the shaft 74 about the axes of the gear 72 corresponds to the rotative speed of the gear 71. Accordingly there will be no rotation of the pinions 75 about their own axes, and it necessarily follows that the same thing is true in connection with the outer pinions 76 which are connected to the pinions 75.

Since the pinions 76 are fixed against rotation about their own axes, under the conditions stated, it follows, of course, that the intermediate pinions 78 also are prevented from rotating about their own axes since these pinions are constantly in mesh with the pinions 76. Accordingly the shafts 74 and 77 rotate about the axis of the gear 72 at a rotative speed exactly equal to that of the latter gear. The gear 82 is secured to the shaft 81 to drive the latter, and its rotation is governed by the pinions 78. Since under the conditions referred to, the pinions 78 are fixed against rotation about their own axes, it will be apparent that the pinion 82 will be caused to rotate at the same speed as the gear 72.

When it is desired to change the speed of rotation of the take off shaft 81 as the power input shaft 14 continues to rotate at the same speed, it merely is necessary to rotate the operating crank 32 to offset the axes of the shafts 35 and 38 with respect to each other. In the embodiment of the invention illustrated, the operation of the crank 32 swings the arms 20 downwardly whereby the axis of the shaft 35 is moved downwardly below the axis of the shaft 38, under which condition the speed of rotation of the shaft 81 will be decreased.

Under the conditions just referred to, the device operates in accordance with an established law of relative motion. For example, if two disks, wheels or other similar members are rotated in adjacent parallel planes at the same speed and in the same direction, and the centers of rotation coincide, it follows that all parts of the disks will maintain the same relative position during continued rotation of the elements referred to. However, if the centers of rotation are moved apart, with the disks running at the same speed and in the same direction, any point on either disk will describe with respect to the other disk a circle having a radius equal to the distance apart of the centers of rotation of the disks. This theory is true of the two rotatable members 37 and 39, and is utilized in the present embodiment of the apparatus for rotating the rotatable member or gear wheel 39 at a greater rate of speed than that of the disk 37.

Assuming that the arms 20 have been moved downwardly by rotating the operating crank 32, the axis of the shaft 35 will occupy a position below the axis of the shaft 38, and under such conditions, it will be apparent that each of the driving posts 40 will describe a circle with respect to the gear wheel 39. One of the components of the circular movement of each post 40 obviously will be, in a sense, a reciprocatory movement with respect to a tangent to the gear wheel 39 drawn between either post 40 and a point on the gear wheel 39 adjacent the corresponding pinions 55 and 56.

With the axes of the shafts 35 and 38 offset in the manner referred to, it will be apparent that so long as the disk 37 rotates, the reciprocatory movement on each post 40 with respect to the peripheral portion of the gear wheel 39 will continue, and movement of each post 40 in one direction during such reciprocatory movement is utilized for effecting rotation of the gear 39. Movement of each post 40 in the opposite direction does not transmit any movement to the gear 39, and it will become apparent therefore that the parts associated with each post 40 operate in the nature of an overrunning clutch to transmit continuous rotary movement in one direction to the gear 39. As distinguished from ordinary overrunning clutches, however, the present construction does not utilize friction clutch devices, pawls or ratchets or other corresponding elements which are subject to uneven movement, slippage, excess wear, etc. The pinions 55 constantly remain in mesh with the gear 39, while each pinion 56 constantly meshes with its corresponding pinion 55. Under the conditions now being considered, each pinion 56 periodically engages the teeth of the gear wheel 39, and during the intervals between such engagement each pinion 56 is disengaged from the teeth of the gear wheel 39 but obviously is in meshing relationship therewith whereby it is adapted to engage the teeth of the gear wheel 39 without clashing, and without material friction or lost motion of any kind.

In the embodiment of the invention illustrated, the disk 37 is positively rotated in the direction of the arrows illustrated in Figures 3 and 5, and with the arms 20 moved downwardly in the manner described, engagement between each pinion 56 and the teeth of the gear 39 takes place adjacent the top of the latter. As each post 40 approaches its uppermost position, that is, as it approaches the top portion of the disk 37, it tends to move forwardly at a greater rate of speed than the peripheral speed of the gear wheel 39, and thus the corresponding arms 41 exert a pull on the pivot pins 53, and the plates 51 will swing about the axis of the pivot pin 54. As previously stated, each pinion 56 is always either in mesh with the gear 39 or is in meshing relationship therewith, and accordingly when the pulling action of the arms 41 occurs, the corresponding pinion 56 will immediately move into engagement with the teeth of the gear 39. Rotation of the pinions 55 and 56 on their own axes obviously will be prevented under such conditions, and the movement referred to operates to effect a locking action between the two pinions whereby the pulling force of the arms 41 will be transmitted to the gear 39.

In the meantime, the other two posts 40 will partake of slower rotative speed than the speed being transmitted to the gear 39 by the driving elements at the upper portion of the disk 37, and accordingly the other two posts referred to will move in a reverse direction with relation to the gear 39. This action causes the two corresponding pairs of arms 41 to exert a pushing force against the corresponding plates 51, and these plates will swing about their pivots 54 to disengage the corresponding pinions 56 from the gear 39. The unlocked pinions 55 and 56 thus are free to rotate about their own axes to compensate for the difference in the rotative speeds referred to. Obviously, the difference between the rotative speeds of the gear 39 and disk 37 will depend upon the distance apart of the axes of the shafts 35 and 38. As this distance is increased, the gear 39 obviously will be driven at progressively higher speeds with respect to the disk 37, and the increase takes place smoothly and uniformly without the introduction of any stepped increases in speed.

The increased speed of the gear 39 obviously will be transmitted from the shaft 38 to the gear wheel 71 through the train of driving elements previously described. It will be apparent that the speed of rotation of the gear 72 is constant, and when the speed of rotation of the gear 71 is increased, this gear obviously travels at a greater rate of speed than the gear 72. Under such conditions, the shafts 74 will travel in a circle about the axis of the gear 72, while each pinion 75 will be caused to rotate about its own axis thus rotating the pinions 76 in the direction of the arrows indicated in Figures 3 and 4.

As previously stated, rotation of the gear 72 in the direction of the arrow indicated in Figure 3 transmits rotary motion in the same direction to the power take off gear 82. However, when differential driving speeds are transmitted to the gears 71 and 72 to rotate the pinions 76 on their own axes in the manner described, such rotary motion is transmitted to the pinions 78 to cause relative rotating movement thereof in the direction of the arrow indicated in Figure 3. This rotation in turn is transmitted to the take off gear 82, and thus this gear will be rotated relatively to the gear 72 in a direction opposite to its normal speed of rotation. The reverse relative rotation of the gear 82 is of course, less than the speed of rotation of the gear 72, and hence the net speed of rotation of the gear 82 will be the difference between the rotation of the gear 72 and the relative reverse rotation of the gear 82. Accordingly the gear 82 will be caused to rotate at a speed slower than its normal speed, and the net speed referred to depends upon the distance to which the shafts 35 and 38 are offset from each other. Accordingly it will be apparent that any decreased speed of the power take-off shaft can be secured by increasing the distance between the shafts 35 and 38.

In the drawings, three power transmitting units have been illustrated between the disk 37 and the gear 39, but it will be apparent that any number of these units may be employed. In the use of the apparatus in connection with the textile industry, and particularly with reference to its use for winding artificial silk filaments on spools or the like, it has been found that three units of the character referred to provides a sufficiently smooth and uniform transmission, but for other uses, it may be desired to increase the number of transmitting units.

It also will be apparent that the speed of the take off shaft readily may be varied without stopping the operation of the machine, and as a matter of fact, changes may take place progressively while the apparatus is in operation. The apparatus is constructed almost entirely of gear elements all of which are either constantly in mesh or in meshing relationship to permit them to mesh without clashing, undue friction or lost motion as would occur with the use of ratchets, friction clutches, etc., which are wholly eliminated from the present construction. The use of the worm and worm wheel as a portion of the transmitting means is preferred inasmuch as it operates as positive means for locking the variable speed members against slipping.

The present apparatus has been illustrated as one embodiment of the invention, but it will be apparent that the epicyclic gearing may be varied according to the particular uses to which the apparatus is to be put. For example, it is entirely possible to design and proportion the gears so that the speed of rotation of the power take off shaft may be reduced to zero and then operated in a reverse direction. By the use of an epicyclic gear train it is possible to provide two driving gears one of which rotates at a constant speed and the other at a variable speed, and to utilize the equal or differential speeds of such gears to drive a power take off shaft at variable speeds.

It is to be understood that the form of our invention herewith shown and described is to be taken as a preferred example of the same and that various changes in the shapes, size and arrangement of parts may be resorted to without departing from the spirit of the invention or the scope of the subjoined claims.

We claim:

1. A variable speed transmission comprising a driving element and a driven element arranged in adjacent parallel relationship to each other and rotatably supported to permit them to be moved transversely of their axes to vary the distance therebetween, and a series of transmitting devices connected between said driving and driven elements, each transmitting device including an element rotatable with said driven element in constant positive engagement therewith, a second rotatable element in constant positive engagement with said first named rotatable element and movable into similar engagement with said driven element, and means connected between said rotatable elements and said driving element to periodically move said second named rotatable element into engagement with said driven element to positively lock said rotatable elements to said driven element.

2. A variable speed transmission comprising a driving element and a driven element arranged in adjacent parallel relationship to each other and rotatably supported to permit them to be moved transversely of their axes to vary the distance therebetween, a gear carried by said driven element, and a series of transmitting devices connected between said driving and driven elements, each transmitting device including a pinion constantly meshing with said gear, a second pinion constantly meshing with said first named pinion, and means connected between said pinions and said driving element to periodically move said second named pinion into mesh with said gear whereby said pinions will be locked to each other and to said gear.

3. A variable speed transmission comprising a driving element and a driven element arranged in adjacent parallel relationship to each other and rotatably supported to permit them to be moved transversely of their axes to vary the distance therebetween, and a series of circumferentially spaced transmitting devices connected between said driving and driven elements, each transmitting device including a carrier circumferentially slidable with respect to said driven element, a rotatable element mounted in said carrier in constant engagement with said driven element, a second rotatable element mounted in said carrier in constant engagement with said first named rotatable element, and means connected between said carrier and said driving element to periodically move said second named rotatable element into engagement with said driven element to positively lock said rotatable elements to each other and to said driven element.

4. A variable speed transmission comprising a driving element and a driven element arranged in adjacent parallel relationship to each other and rotatably supported to permit them to be moved transversely of their axes to vary the distance therebetween, a gear carried by said driven element, and a series of circumferentially spaced transmitting devices connected between said driving and driven elements, each transmitting device including a carrier circumferentially slidable with respect to said driven element, a pinion mounted in said carrier in constant mesh with said gear, a second pinion mounted in said carrier in constant engagement with said first named pinion, and means connected between said carrier and said driving element to periodically move said second named pinion into engagement with said gear to positively lock said pinions with respect to each other and with respect to said gear.

5. A variable speed transmission comprising a driving element and a driven element arranged in adjacent parallel relationship to each other and rotatably supported to permit them to be moved transversely of their axes to vary the distance therebetween, said driven element being provided on opposite sides with circumferential guides, a gear carried by said driven element, and a series of circumferentially spaced transmitting devices connected between said driving and driven elements, each transmitting device including a carrier having plates arranged on opposite sides of said driven element and provided with portions slidable in said guide, a pinion mounted in said carrier in constant mesh with said gear, a second pinion mounted in said carrier in constant engagement with said first named pinion, and means connected between said carrier and said driving element to periodically move said second named pinion into engagement with said gear to positively lock said pinions with respect to each other and with respect to said gear.

6. Apparatus constructed in accordance with claim 5 wherein each carrier further comprises a pair of spaced plates pivoted about the axis of said first named pinion and rotatably supporting said second named pinion, the means for moving said second named pinion into engagement with said gear comprising a member connected between said driving element and said second named plates to swing the latter about their pivot axis.

7. Apparatus constructed in accordance with claim 5 wherein each carrier further comprises a pair of spaced plates pivoted about the axis of said first named pinion, said second named pinion being rotatably supported by said second named plates at a point spaced from said first named pinion, the means for moving said second named pinion into engagement with said gear comprising a member pivotally connected at one end of said driving element at a point circumferentially spaced from said carrier and at its opposite end of said second named plates at a point offset laterally from the plane of the axes of said pinions.

8. A variable speed transmission comprising a driving element and a driven element arranged in adjacent parallel relationship to each other and rotatably supported to permit them to be moved relatively transversely of their axes to vary the distance therebetween, and a series of transmitting devices connected between said driving and driven elements, each transmitting device including a pair of members one of which is in constant positive engagement with said driven element and with the other member of said pair, and means connected between said pair of members and said driving element to periodically move the second mentioned member of said pair into positive engagement with said driven element to positively lock said pair of elements against movement with respect to each other and with respect to said driven element.

9. A variable speed transmission comprising a driving element and a driven element arranged in adjacent parallel relationship to each other and rotatably supported to permit them to be moved relatively transversely of their axes to vary the distance therebetween, and a series of transmitting devices connected between said driving and driven elements, each transmitting device including a pair of members one of which is positively rotated by said driven element and in constant engagement with the other member of said pair, and means connected between said pair of members and said driving element to bring the second mentioned member of said pair into periodical positive engagement with said driven element to positively lock the first named member of said pair and said driven element against relative rotation.

10. A variable speed transmission comprising a driving element and a driven element arranged in adjacent parallel relationship to each other and rotatably supported to permit them to be moved transversely of their axes to vary the distance therebetween, a gear carried by said driven element, and a series of transmitting devices connected between said driving and driven elements, each transmitting device including a pinion constantly meshing with said gear, a pair of plates arranged on opposite sides of said pinion and said gear and pivotally supporting said pinion, said plates being circumferentially slidable with respect to said gear, a second pinion pivotally supported between said plates and constantly meshing with said first named pinion, and means connected between said driving element and said plates at a point spaced from the axes of said pinions to periodically swing said plates about the axis of said first named pinion to move said second named pinion into mesh with said gear whereby said pinions will be locked to each other and to said gear.

In testimony whereof we affix our signatures.

FREDERICK W. ARMITAGE.
EDWARD G. ARCHER.